(12) United States Patent
Sharma et al.

(10) Patent No.: US 12,424,239 B2
(45) Date of Patent: Sep. 23, 2025

(54) SYSTEM AND METHOD FOR ACOUSTIC CHANNEL IDENTIFICATION-BASED DATA VERIFICATION

(71) Applicant: Microsoft Technology Licensing, LLC., Redmond, WA (US)

(72) Inventors: Dushyant Sharma, Tracy, CA (US);
Uwe Helmut Jost, Groton, MA (US);
Patrick Aubrey Naylor, Reading (GB);
Ljubomir Milanovic, Vienna (AT);
William Francis Ganong, III, Brookline, MA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 469 days.

(21) Appl. No.: 17/942,289

(22) Filed: Sep. 12, 2022

(65) Prior Publication Data

US 2024/0087593 A1 Mar. 14, 2024

(51) Int. Cl.
*G10L 25/51* (2013.01)
*G10L 25/87* (2013.01)
*H04S 7/00* (2006.01)

(52) U.S. Cl.
CPC .............. *G10L 25/51* (2013.01); *G10L 25/87* (2013.01); *H04S 7/302* (2013.01); *H04S 2420/01* (2013.01)

(58) Field of Classification Search
CPC ......... G10L 25/51; G10L 25/87; H04S 7/302; H04S 2420/01
See application file for complete search history.

(56) References Cited

U.S. PATENT DOCUMENTS

| | | | |
|---|---|---|---|
| 10,109,294 B1* | 10/2018 | Ayrapetian | G10L 21/0208 |
| 11,705,133 B1* | 7/2023 | Aggarwal | G06V 40/172 |
| | | | 704/246 |
| 2004/0263637 A1* | 12/2004 | Serizawa | H04N 23/84 |
| | | | 348/222.1 |
| 2010/0166190 A1* | 7/2010 | Aarts | H04S 7/30 |
| | | | 381/1 |
| 2013/0251024 A1* | 9/2013 | Li | H04N 19/56 |
| | | | 375/E7.076 |
| 2018/0077507 A1* | 3/2018 | Bernal Castillo | G01H 17/00 |
| 2021/0014614 A1* | 1/2021 | Donley | H04S 1/005 |
| 2021/0034725 A1* | 2/2021 | Donley | H04R 1/406 |
| 2021/0368254 A1* | 11/2021 | Kemmerer | G06F 3/017 |
| 2024/0064482 A1* | 2/2024 | Rau | H04R 1/1091 |

* cited by examiner

Primary Examiner — Oyesola C Ojo
(74) Attorney, Agent, or Firm — Foley IP Law, PLLC (57) ABSTRACT

A method, computer program product, and computing system for determining a plurality of transfer functions for a plurality of corresponding segments from a reference recording and a suspect recording. A delta transfer function between the plurality of transfer functions of a pair of corresponding segments of the plurality of corresponding segments is determined. A recording comparison confidence score is generated for the pair of corresponding segments based upon, at least in part, the delta transfer function. The suspect recording is verified based upon, at least in part, the plurality of recording comparison confidence scores.

17 Claims, 7 Drawing Sheets

SYSTEM AND METHOD FOR ACOUSTIC CHANNEL IDENTIFICATION-BASED DATA VERIFICATION

BACKGROUND

Conversational speech signals may be stored for use as training data to further enhance the accuracy of speech processing systems generally. However, when unauthorized reproductions or recordings of the conversational speech signals are made available, it is difficult to distinguish between verified recordings and unverified recordings.

BRIEF DESCRIPTION OF THE DRAWINGS

Like reference symbols in the various drawings indicate like elements.

DETAILED DESCRIPTION OF THE PREFERRED EMBODIMENTS

As discussed above, processing and storing conversational signals (e.g., audio encounter information and/or video encounter information) present a security concern. For example, with the widespread use of remote audio-video conferencing solutions, the threat of bootleg recordings being made and circulated have increased. In this manner, unauthorized or unverified recordings of encounter information may be identified in publicly accessible resources. However, in a case where a genuine recording is modified in some non-malicious way (e.g. by applying an additional codec or by encoding/trimming/decoding the recording), it is difficult to determine whether a particular suspect recording is the same as a verified, reference recording or if it is a bootleg version of the reference recording. For example, the same encounter information may be present in both a verified reference recording and a suspect recording making it difficult to distinguish.

As will be discussed in greater detail below, implementations of the present disclosure verify whether a suspect recording is an authorized recording using transfer functions (e.g., acoustic transfer functions and/or video transfer functions). The transfer functions (e.g., acoustic transfer functions and/or video transfer functions) in each recording are compared to define a delta transfer function (i.e., the difference between the transfer functions for a pair of corresponding segments) which is used to generate a comparison confidence score. With the comparison confidence score, suspect recordings that are the same as verified recordings are identified and those that are unauthorized are identified. Additionally, transfer functions are monitored over time to determine whether a suspect recording has been tampered with.

The details of one or more implementations are set forth in the accompanying drawings and the description below. Other features and advantages will become apparent from the description, the drawings, and the claims.

The Recording Verification Process:

Referring to FIGS. 1-7, recording verification process 10 determines 100 a plurality of transfer functions for a plurality of corresponding segments from a reference recording and a suspect recording. A delta transfer function between the plurality of transfer functions of a pair of corresponding segments of the plurality of corresponding segments is determined 102. A recording comparison confidence score is generated 104 for the pair of corresponding segments. The suspect recording is verified 106 based upon, at least in part, the recording comparison confidence score.

As will be discussed in greater detail below, implementations of the present disclosure allow for the verification of a suspect recording using transfer functions particular to the type of recording. For example, suppose an audio recording system captures and records a conversation between a doctor and a patient. In this example, the audio encounter information is a verified audio recording of the interaction between the doctor and the patient. In another example, suppose a machine vision system and an audio recording system are deployed in a conference room to record a presentation. In this example, the encounter information includes a verified video recording and a verified audio recording of the presentation.

However, suppose that during the above described presentation, a participant uses a separate computing device with a camera and/or microphone to record at least a portion of the presentation. In this example, the encounter information recorded by this patient's device is not verified (e.g., not authorized). Suppose that access to a verified copy of the recording is allowed under particular circumstances (i.e., with a subscription, with authorized sharing, etc.). In this example, given the similar content in each recording, it may be difficult to determine whether or not other copies of the recording are verified or authorized. As will be discussed in greater detail below, by determining transfer functions (e.g., acoustic transfer functions for audio recordings and/or video transfer functions for video recordings) between the reference recording and the suspect recording, implementations of the present disclosure are more robust than other audio or video matching algorithms. Further, by analyzing a number of delta transfer functions, implementations of the present disclosure allow characterization of certain acoustic properties of the environment and transducers that a suspect recording source (i.e., an individual or entity that creates unverified or unauthorized recording) uses to detect identify a suspect recording source and to identify those characteristics in future recordings.

As recording verification process 10 generates acoustic transfer functions for audio recordings and video transfer functions for video recordings, each approach will be described in greater detail below.

Figure 1:
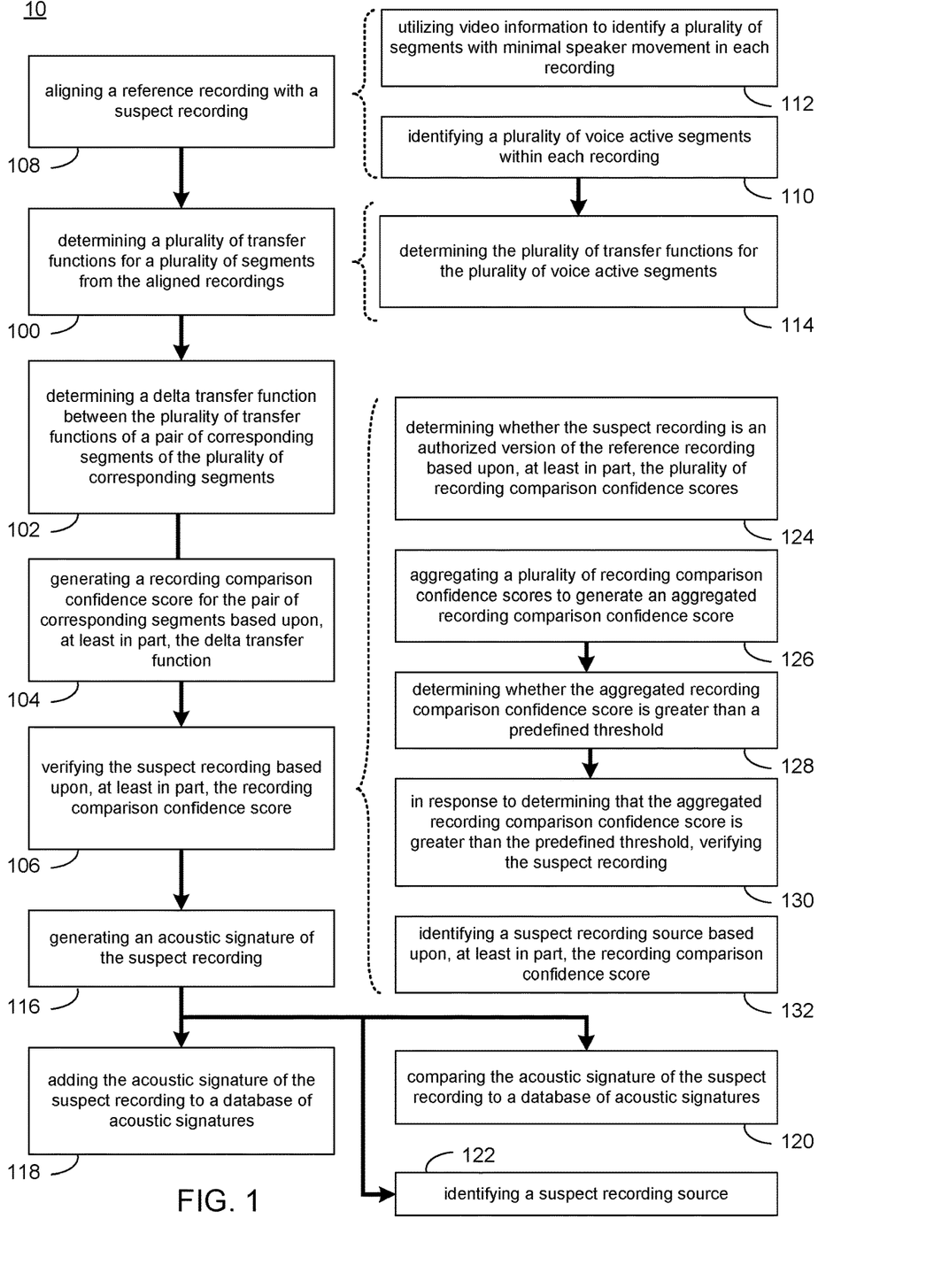
FIG. 1 is a flow chart of an implementation of a recording verification process.
Figure 2:
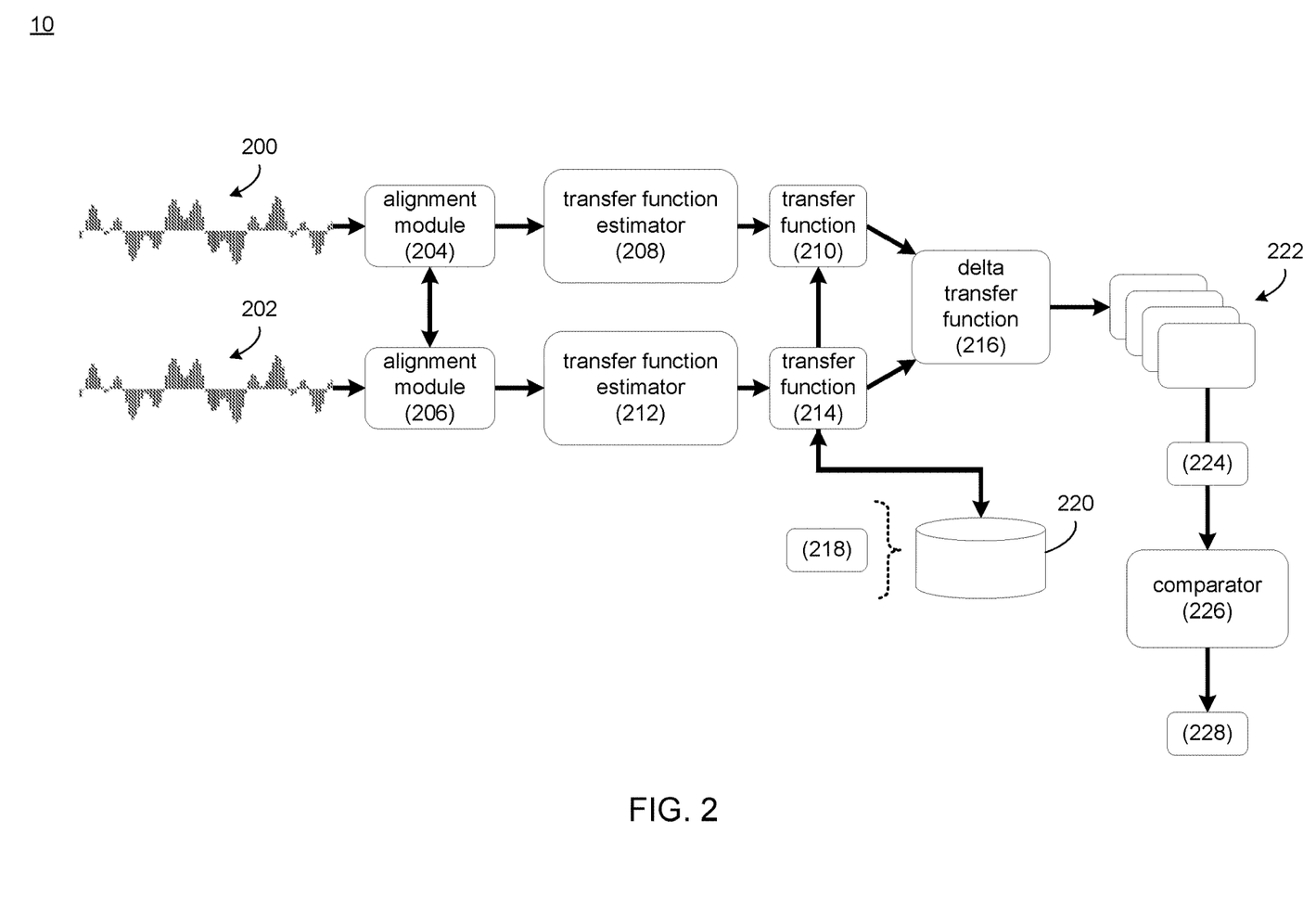
FIG. 2 is a diagrammatic view of the recording verification process.

In some implementations, recording verification process 10 aligns 108 a reference recording with a suspect recording. As discussed above, a reference recording is a known, verified copy of a recording while a suspect recording is a separate recording that includes the same content and is suspected of being a bootleg or unauthorized copy of the reference recording. Accordingly, the reference recording is used to verify the suspect copy. Referring also to FIG. 2 and in one example, suppose that recording verification process 10 obtains a reference recording (e.g., reference recording 200). In this example, suppose that reference recording 200 is an audio recording of an interaction between a doctor and a patient. Suppose that reference recording 200 is recorded using an audio recording system. Now, suppose that recording verification process 10 obtains a suspect recording (e.g., suspect recording 202). For example, suspect recording 202 is provided to recording verification process 10 for verification purposes (i.e., to determine whether suspect recording 202 is a verified copy of reference recording 200 or is an unverified copy of reference recording 200). In some implementations, recording verification process 10 verifies a suspect video recording from a reference audio recording and/or a suspect audio recording from a reference video recording.

Aligning 108 the reference recording with the suspect recording includes identifying 110 a plurality of voice active segments within each recording. Specifically, in the example of an audio recording, recording verification process 10 aligns 108 the reference recording (e.g., reference recording 200) with the suspect recording (e.g., suspect recording 202) by using an alignment module (e.g., alignment module 204). Alignment module 204 is any software, hardware, or combination of software and hardware that aligns multiple signals. In some implementations, the recordings are aligned overall, or piece-wise. For example, piece-wise alignment can be used when different time-shifts are required to align the recordings at different times in the recordings. For example, alignment module 204 is a voice activity detection (VAD) system that identifies 110 a plurality of voice active segments or portions within each recording. In this example, alignment module 204 (e.g., a voice activity detection system) processes reference recording 200 while alignment module 206 processes suspect recording 202 to identify 110 a plurality of voice active segments in each recording. A voice active segment is a predefined portion or duration of a recording that includes speech activity. In one example, the voice active segment begins when voice activity is detected and ends when voice activity is no longer detected. In another example, the voice active segment includes a predefined segment size including voice activity (e.g., each one second segment of a recording that includes voice activity). In some implementations, the duration of a segment is user-defined, a default duration, and/or determined automatically by recording verification process 10.

In some implementations, alignment modules 204, 206 (e.g., a voice activity detection system) detect segments of each recording that include a threshold amount of energy (e.g., signal activity in terms of frequency and magnitude) that is indicative of human speech. In this example, alignment modules 204, 206 align 108 reference recording 200 and suspect recording 202 by identifying 110 and matching corresponding voice active segments within each recording. In one example, recording verification process 10 aligns the voice active segments within each recording by adding a linear time shift to either or both of the suspect recording and the reference recording. In some implementations, recording verification process 10 adds a linear shift when the voice active segments of each recording are of the same length. In another example, recording verification process 10 aligns the voice active segments within each recording by performing a dynamic time warp (i.e., determining a mapping from voice active segments within the reference recording to voice active segments within the suspect recording, such that the mapping is monotonic and minimizes the distance between the spectra of the reference recording and the suspect recording). In some implementations, recording verification process 10 performs a dynamic time warp when the voice active segments of each recording are of different lengths.

Suppose a meeting is being broadcast to various remote participants. Now, suppose someone generates a recording by playing the audio of the meeting out of a loudspeaker and recording the audio on a microphone in a room. In this example, there is a small delay between the reference recording and the suspect recording due to the acoustic propagation path as well as differences in the recording hardware (e.g., ADC to DAC, different sampling rates, different codecs, etc.). There will also be convolution with a different room impulse response and a different noise field in the two recordings. As will be discussed in greater detail below and in some implementations, acoustic transfer functions are determined for speech active regions. As such, even though there may be a small, linear misalignment between the recordings, recording verification process 10 aligns 108 the reference recording and the suspect recording by identifying 110 speech activity. In one example, recording verification process 10 aligns 108 (e.g., using linear time shifts, dynamic time warp, etc.) the plurality of voice active segments to the nearest e.g., 10 milliseconds (e.g., with the assumption that the voice activity segment is surrounded by pauses and the speakers are not moving rapidly).

Aligning 108 the reference recording and the suspect recording includes using 112 video information to identify a plurality of segments with minimal speaker movement in the reference recording. For example, suppose that a machine vision system generates and records machine vision encounter information/video information during the encounter between e.g., a doctor and a patient. In this example, recording verification process 10 uses 112 the video information to identify a plurality of segments with minimal speaker movement in the reference recording, where the minimal speaker movement is a predefined threshold (e.g., no movement or threshold number of segments without movement, etc.). For example, suppose during the first half of the encounter, the doctor is moving around the room while performing an examination on the patient but is stationary during the second half of the encounter. In this example, machine vision encounter information indicates that the doctor is moving while speaking during the first half of the encounter but is not moving during the second half of the encounter. Accordingly, recording verification process 10 uses 112 this video information to identify the segments during the second half of reference recording 200 as these segments provide a more reliable or stable basis for aligning 108 segments within reference recording 200 and suspect recording 202 than segments with speaker movement. As will be described in greater detail below, segments with minimal speaker movement allow for more accurate determination of audio transfer functions for corresponding segments of each recording.

In some implementations, recording verification process 10 determines 100 a plurality of audio transfer functions for a plurality of corresponding segments of a reference recording and a suspect recording. An acoustic transfer function (ATF) is the mapping between a sound level of a source, and the sound level at the receiver for a particular acoustic environment as a function of frequency. In one example, the format of the acoustic transfer function is a vector or matrix of values that map the change in the acoustic properties from the source to the receiver within an acoustic environment. In some implementations, the format of the acoustic transfer function is adaptable to particular recordings.

In some implementations, the acoustic transfer function is determined 100 or measured by a transfer function estimator. In one example, recording verification process 10 determines 100 or measures the acoustic transfer function for a particular segment of a recording by applying a neural filter estimator. A neural filter estimator is a neural network architecture trained to directly estimate a filter representative of the change in the sound level at a source and the sound level at a receiver as a function of frequency. In one example, the neural filter estimator is a convolutional neural network (CNN) that models a convolutive transfer function where the acoustic properties (i.e., reverberation, noise, etc.) that change as a signal propagates from source to receiver are represented by convolving clean speech spectral coefficients with spectral filter coefficients along the time dimension for each frequency bin. In some implementations, the U-net structure (i.e., fully-convolutional auto-encoder network with skip-connections) is used for the CNN architecture.

Referring again to FIG. 2, recording verification process 10 uses a transfer function estimator (e.g., transfer function estimator 208) to determine 100 an acoustic transfer function (e.g., transfer function 210) for each channel of reference recording 200 and transfer function estimator 212 to determine 100 an acoustic transfer function (e.g., transfer function 214) for each channel of suspect recording 202. While transfer function estimators 208, 212 are shown as separate estimators, it will be appreciated that the same estimator may be used for both reference recording 200 and suspect recording 202 at different times or that separate estimators can be used.

In some implementations, recording verification process 10 uses video information to enhance the determination 100 of acoustic transfer functions by processing a sequence of images associated with a segment to a neural network or other machine learning model that uses both video and audio information to estimate the acoustic transfer function for a particular segment. For example and as discussed above, suppose recording verification process 10 obtains machine vision information/video information associated with an encounter or meeting (e.g., a video recording of a meeting between in-person and/or remote participants). In this example, recording verification process 10 uses the video information to identify acoustic environment information associated with the acoustic transfer function. For example, the video information describes distance between the sound source and the microphone, orientation of the speaker relative to the microphone, location of the sound source relative to the microphone, etc. In this manner, the combination of video and audio information enhances the determination of acoustic transfer functions for the plurality of segments.

In some implementations, determining 100 the plurality of acoustic transfer functions for the plurality of segments of the aligned recordings includes determining 114 the plurality of transfer functions for the plurality of voice active segments. Continuing with the above example, suppose that recording verification process 10 identifies 110 plurality of voice active segments within each recording. In this example, recording verification process 10 determines 114 the transfer function for each voice active segment of each recording. As shown in the example of FIG. 2, recording verification process 10 determines 204 a plurality of acoustic transfer functions (e.g., transfer function 210) for reference recording 200 and a plurality of acoustic transfer functions (e.g., transfer function 214) for suspect recording 202.

As discussed above, recording verification process 10 determines 100 or measures a video transfer function for a video recording. For example and referring again to FIG. 2, suppose that reference recording 200 is a video recording and that suspect recording 202 is a video recording. In some implementations, recording verification process 10 aligns 108 a reference recording with a suspect recording. As shown in FIG. 2, recording verification process 10 aligns reference recording 200 with suspect recording 202 using alignment module 204 and alignment module 206. However, it will be appreciated that the same alignment module (e.g., alignment module 204) can be used or separate alignment modules can be used. In the example of video recordings, alignment module 204 aligns 108 segments or individual image portions using a comparison of individual images of each recording. In one example, recording verification process 10 performs a two-dimensional fast Fourier transform on each segment or image portion of each recording and aligns 108 reference recording 200 with suspect recording 202 using the two-dimensional fast Fourier transform for a plurality of the segments of each recording.

In some implementations, recording verification process 10 determines 100 a plurality of transfer functions for a plurality of segments of the aligned recordings. In the example of video recordings, recording verification process 10 determines or measure various video-based transfer functions for the plurality of segments/individual image portions of each recording. As with the acoustic transfer function, the video-based transfer function is a vector or matrix of image-based changes between the properties of the scene recorded and the video signal. In one example, recording verification process 10 determines 100 an opto-electronic transfer function where the scene light is taken as input and the output is the resulting picture or video signal. In this manner, the opto-electronic transfer function is an estimate of the light level changes between a target person in the scene and the camera (using known image processing algorithms that can estimate depth from two-dimensional images). In some implementations, this is extended to sequences of images (i.e., video).

In another example, recording verification process 10 determines 100 an opto-optical transfer function where the scene light is taken as input and the output is the displayed light (e.g., on a display device). As discussed above relative to acoustic transfer functions and in some implementations, various machine learning models/neural networks are trained to determine 100 the video transfer functions for each recording. In some implementations, recording verification process 10 uses video information to verify, at any point in time, whether the visual scene in the suspect recording matches the verified view in the reference recording. Referring again to the example of FIG. 2, recording verification process 10 determines 100 a plurality of video transfer functions (e.g., transfer function 210) for reference video recording 200 and a plurality of video transfer functions (e.g., transfer function 214) for suspect video recording 202.

In some implementations, recording verification process 10 determines 102 a delta transfer function between the plurality of transfer functions of a pair of corresponding segments of the plurality of segments. For example, a delta transfer function is the difference between the transfer functions for a pair of corresponding segments of each recording. As discussed above, by aligning 108 reference recording 200 and suspect recording 202, corresponding segments of each recording are comparable. In some implementations, recording verification process 10 determines 102 a delta transfer function for a pair of corresponding segments of the plurality of segments of each recording by determining a difference between the transfer functions determined for each segment. Recording verification process 10 determines the delta transfer function for video recordings and audio recordings in the same manner (e.g., by determining a difference between transfer functions of corresponding segments of each recording). As shown in FIG. 2, recording verification process 10 determines 102 a delta transfer function (e.g., delta transfer function 216) by determining the difference between transfer function 210 and transfer function 214. In some implementations, any number of delta transfer functions (e.g., one for each pair of corresponding segments of the recordings) are determined 102.

In some implementations, recording verification process 10 generates 116 an acoustic signature of the suspect recording. An acoustic signature is a representation of the acoustic properties that identify or represent a particular acoustic environment. The acoustic signature may be a vector or other data structure including various values for particular acoustic properties (e.g., reverberation, room volume, reflection coefficient, etc.). In one example, recording verification process 10 generates 116 an acoustic signature by extracting the acoustic properties of each recording and storing them in a vector or other data structure. In some implementations, the acoustic properties are determined for each recording generally or for each segment individually. In one example, recording verification process 10 uses a Non-Intrusive Speech Assessment (NISA) system to identify acoustic parameters or properties from an input speech signal. A NISA system is a multi-task machine learning framework for non-intrusive acoustic parameter estimation that includes voice activity detection (VAD), C50 (i.e., the ratio of the early sound energy (between 0 and 50 milliseconds) and the late sound energy (that arrives later than 50 milliseconds) in a room impulse response (RIR)), Perceptual Evaluation of Speech Quality (PESQ), and segmental SNR which is able to reliably estimate a number of parameters in short windows of length 300 milliseconds using the multi-task training paradigm.

In some implementations, recording verification process 10 generates 116 an acoustic signature for suspect recording 202 by extracting acoustic properties from a plurality of transfer functions (e.g., transfer functions 210, 214). As discussed above, the acoustic signature is a representation of a respective recording's acoustic environment (e.g., reverberation, room volume, reflection coefficient, etc. defined in a vector or other data structure) that can be used when addressing suspect recordings that have the same acoustic signature. In some implementations, recording verification process 10 uses audio and video information to estimate the acoustic signatures of a room. For example, by using known techniques for estimating a room impulse response given images of a room, recording verification process 10 uses video information along with the audio information to estimate the acoustic signatures of a room (e.g., the room volume, position of obstructions in room, etc.).

In some implementations, recording verification process 10 adds 118 the acoustic signature to a database of acoustic signatures. For example, recording verification process 10 adds 118 or stores an acoustic signature (e.g., acoustic signature 218) to a database of acoustic signatures (e.g., database of acoustic signatures 220). In this manner, recording verification process 10 uses these entries to determine whether or not a suspect recording shares the same (or a sufficiently similar) acoustic signature in order to identify a particular known individual or entity who produces unverified recordings.

In some implementations, recording verification process 10 compares 120 the acoustic signature of the suspect recording to a database of acoustic signatures. As discussed above, recording verification process 10 uses the database of acoustic signatures to attempt to identify a known individual entity associated with unverified recordings. For example, suppose that an acoustic signature is generated 116 for a particular acoustic environment that is later not verified (e.g., recording verification process 10 determines that the suspect recording is not an authorized copy of the reference recording). Recording verification process 10 generates 116 an acoustic signature for each suspect recording and compares 120 the acoustic signature to the contents of the database of the acoustic signatures. In one example, recording verification process 10 compares 120 acoustic signature 218 to the contents of database 220 and determines that acoustic signature 218 has not been identified before. In this example, recording verification process 10 adds 118 acoustic signature 218 to database 220.

In another example, recording verification process 10 determines that acoustic signature 218 has previously been identified. In this example, recording verification process 10 flags the suspect recording as being associated with a known entity with prior unverified recording(s). In some implementations, when an acoustic signature is located within the database of acoustic signatures, an alert or notification is generated indicating that the suspect recording includes an acoustic signature associated with a previously unverified recording. In some implementations, the comparison of the acoustic signature of the suspect recording with the contents of the database of acoustic signatures includes using a similarity threshold for determining whether or not the acoustic signature of the suspect recording is already stored in the database. The similarity threshold is user-defined, a default threshold, or determined dynamically by recording verification process 10.

In some implementations, recording verification process 10 identifies 122 a suspect recording source based upon, at least in part, the acoustic signature of the suspect recording to an acoustic signature of the reference recording. For example, by comparing acoustic signatures from the reference recording and the suspect recording, recording verification process 10 identifies 122 the suspect recording source. A suspect recording source is the particular channel (e.g., video or audio channel) from which the suspect recording is recorded. In some implementations, recording verification process 10 generates an acoustic signature or accesses a pre-existing acoustic signature for the reference recording. In one example, recording verification process 10 generates an acoustic signature for each channel of the reference recording (e.g., a channel for each video and/or audio source).

Suppose that a meeting is recorded including a small group of in-person participants and a few remote participants (e.g., participants participating with client electronic devices). As such, an authorized, reference recording includes a plurality of channels for each participant (e.g., a video channel and an audio channel for the in-person participants and a video channel and an audio channel for each remote participant). In this example, recording verification process 10 generates an acoustic signature for each channel (e.g., an acoustic signature for the in-person audio channel and acoustic signatures for each remote audio channel). Recording verification process 10 compares the acoustic signature of the suspect recording with the acoustic signature of the reference recording. Suppose that the suspect recording was captured by one of the remote participants. In this example, a comparison of the acoustic signature of the suspect recording to the acoustic signature of the channel of that remote participant's channel indicates that the suspect recording was captured by the remote participant. Accordingly, recording verification process 10 identifies 122 a suspect recording source (e.g., the remote participant) based upon, at least in part, the acoustic signature of the suspect recording and the acoustic signature of the reference recording.

In some implementations, recording verification process 10 generates 104 a recording comparison confidence score for the pair of corresponding segments based upon, at least in part, the delta transfer function. A recording comparison confidence score is a numerical score generated for each segment of the aligned recordings based on the delta transfer function which indicates the similarity between the transfer functions of the reference recording and the suspect recording. In one example, the recording comparison confidence score is a value ranging between "0" and "1" where "0" indicates that the delta transfer function indicates no similarity between the segments of the reference recording and the suspect recording and where "1" indicates that the delta transfer function indicates that the segments of the reference recording and the suspect recording are exactly the same. In one example, the recording comparison confidence score is generated by analyzing and assigning a weighted value or importance to different parts of the plurality of delta transfer functions in the frequency domain. In another example, the recording comparison confidence score is generated by analyzing and assigning a weighted value to different time segments of the plurality of delta transfer functions in the time domain (e.g., early reflections or the late reverberation tail in the plurality of delta transfer functions).

In some implementations, a recording comparison confidence score is determined using a machine learning model trained to receive a delta transfer function and output a score indicating the confidence that the transfer functions of the reference recording and the suspect recording are the same. For example, a machine learning model is trained with labeled training data including delta transfer functions that are associated with reference recordings and suspect recordings that are known to be the same (i.e., the suspect recording is a verified copy of the reference recording) and training data including delta transfer functions that are associated with reference recordings and suspect recordings that are known to not be the same (i.e., the suspect recording is not a verified copy of the reference recording). In this example, recording verification process 10 uses a machine learning model to generate the plurality of recording comparison confidence scores for the plurality of segments. Referring again to FIG. 2, recording verification process 10 generates 104 a plurality of recording comparison confidence scores (e.g., recording comparison confidence scores 222) for the plurality of pairs of corresponding segments (i.e., corresponding segments in the aligned recordings).

In some implementations, recording verification process 10 verifies 106 the suspect recording based upon, at least in part, the recording comparison confidence score. Verifying 106 the suspect recording includes determining whether the suspect recording is a verified copy of the reference recording or is an unauthorized (e.g., bootleg) copy of the reference recording. In some implementations, verifying 106 the suspect recording includes determining 124 whether the suspect recording is an authorized version of the reference recording based upon, at least in part, the plurality of recording comparison confidence scores. For example, recording verification process 10 uses the plurality of recording comparison scores to determine whether the delta transfer functions for the plurality of pairs of corresponding segments are sufficiently similar to verify the suspect recording as a verified copy of the reference recording or are sufficiently dissimilar to verify that the suspect recording is not a verified copy of the reference recording. By measuring the plurality of transfer functions directly as discussed above, implementations of the subject disclosure are more robust than other audio matching approaches.

In some implementations, verifying 106 the suspect recording includes: aggregating 126 a plurality of recording comparison confidence scores to generate an aggregated recording comparison confidence score; determining 128 whether the aggregated recording comparison confidence score is greater than a predefined threshold; and, in response to determining that the aggregated recording comparison confidence score is greater than the predefined threshold, verifying 130 the suspect recording. For example and as shown in FIG. 2, recording verification process 10 aggregates 126 the plurality of recording comparison confidence scores (e.g., recording comparison confidence scores 222) to generate an aggregated recording comparison confidence score (e.g., aggregated recording comparison confidence score 224). Recording verification process 10 determines 128 whether the aggregated recording comparison confidence score is greater than a predefined threshold.

As shown in FIG. 2, a comparator (e.g., comparator 226) includes a hardware and/or software component that compares aggregated recording comparison confidence score 224 against a predefined threshold. The predefined threshold is user-defined, a default value, and/or dynamically generated using recording verification process 10. In a similar manner to the generation of recording comparison confidence scores described above, recording verification process 10 uses a machine learning model to generate the predefined threshold. For example, labeled training data including aggregated recording comparison confidence scores that are associated with reference recordings and suspect recordings that are known to be the same (i.e., the suspect recording is a verified copy of the reference recording) and training data including aggregated recording comparison confidence scores that are associated with reference recordings and suspect recordings that are known to not be the same (i.e., the suspect recording is not a verified copy of the reference recording). In this example, recording verification process 10 uses the machine learning model to generate the predefined threshold for verifying the suspect recording.

In some implementations, recording verification process 10 determines 128 whether the aggregated recording comparison confidence score is greater than the predefined threshold. For example, if the aggregated recording comparison confidence score is less than the predefined threshold, this indicates that the delta transfer functions between the suspect recording and the reference recording are dissimilar. As such, the suspect recording is likely not a verified copy of the reference recording given the relatively distinct transfer functions for the suspect recording. In this example, recording verification process 10 verifies 130 that suspect recording 202 is not a verified copy of reference recording 200 by generating an alert or notification (e.g., notification 228). Notification 228 includes a message, prompt, signal or other communication provided to various recipients indicating that suspect recording 202 is not a verified copy of reference recording 200.

In one example and as discussed above, suppose that a meeting is recorded including a small group of in-person participants and a few remote participants (e.g., participants participating with client electronic devices). As such, the authorized, reference recording includes a plurality of channels for each participant (e.g., a video channel and an audio channel for the in-person participants and a video channel and an audio channel for each remote participant). In this example, suppose a remote participant makes an unauthorized acoustic recording (e.g., the suspect recording). As the remote participant speaks during the meeting, the participant's acoustic transfer function will be distinct in the suspect recording from their acoustic transfer function in the reference recording. In this example, the delta transfer function indicates a significant difference in the acoustic transfer function of the remote participant in the suspect recording from the reference recording because the remote participant speaks during the meeting thus generating an acoustic transfer function that is distinct from that participant's acoustic transfer function in the reference recording. In other words, the acoustic transfer function in the suspect recording represents the speech signals from the remote participant that are received by the microphone of the recording device while the acoustic transfer function in the reference recording represents the speech signals from the remote participant but received by the participant's microphone for the meeting. Accordingly, these acoustic transfer functions are distinct and yield a delta transfer function that is different from the other acoustic channels of the reference recording.

In response to determining that the aggregated recording comparison confidence score is greater than the predefined threshold, recording verification process 10 verifies 106 that suspect recording 202 is a verified copy of reference recording. For example, if the aggregated recording comparison confidence score is greater than or equal to the predefined threshold, this indicates that the delta transfer functions between the suspect recording and the reference recording are similar. As such, the suspect recording is likely a verified copy of the reference recording given the relatively similar transfer functions for the suspect recording and the reference recording. In one example, recording verification process 10 verifies 106 suspect recording 202 by generating an alert or notification (e.g., notification 228). Notification 228 includes a message, prompt, signal or other communication provided to various recipients indicating that suspect recording 202 is a verified copy of reference recording 200.

In another example, suppose that an authorized recording of a patient encounter between a doctor and a patient is recorded by an audio recording system. Now, suppose that an additional recording is made by a separate computing device. In this example, suspect recording 202 is identified and verified by recording verification process 10. For example, recording verification process 10 aligns 108 suspect recording 202 with the authorized, reference recording (e.g., reference recording 200) and determines 100 a plurality of transfer functions for a plurality of segments from the aligned recordings. A delta transfer function is determined 102 between a plurality of pairs of corresponding segments of the plurality of segments. With the delta transfer function(s), a recording comparison confidence score is generated 104. Suppose that in this example, the delta transfer function is large which indicates that the transfer functions between the recordings are not similar. Accordingly and in this example, the recording comparison confidence score indicates that suspect recording 202 is likely not a verified copy of reference recording 200 (i.e., closer to "0" than "1"). In this manner, recording verification process 10 verifies 106 that suspect recording 202 is not a verified copy of reference recording 200. In some implementations, a remedial action is taken in response to verifying that a suspect copy is not a verified copy of the reference recording.

In some implementations, verifying 106 the suspect recording includes identifying 132 a suspect recording source based upon, at least in part, the recording comparison confidence score. Suppose that a meeting is recorded including a small group of in-person participants and a few remote participants (e.g., participants participating with client electronic devices). As such, an authorized, reference recording includes a plurality of channels for each participant (e.g., a video channel and an audio channel for the in-person participants and a video channel and an audio channel for each remote participant). In this example, recording verification process 10 determines the transfer functions for each of the acoustic channels in the recording and determines a plurality of delta transfer functions. Recording verification process 10 identifies 132 a suspect recording source by determining, from the plurality of delta transfer functions, which of the reference channels is the most similar to the transfer function of the suspect recording.

Figure 3:
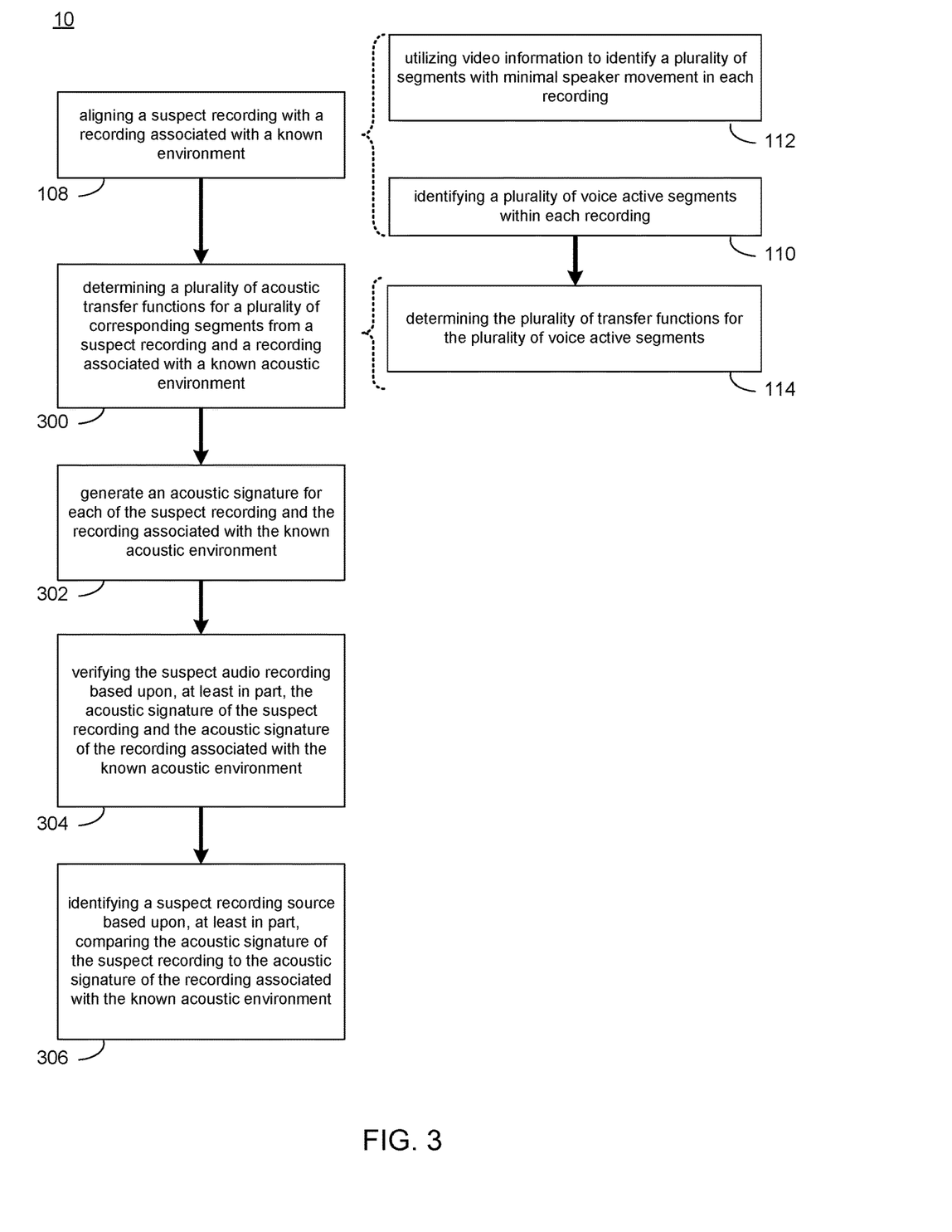
FIG. 3 is a flow chart of an implementation of the recording verification process.

In some implementations and referring also to FIG. 3, recording verification process 10 determines 300 an acoustic transfer function for a plurality of corresponding segments from a suspect recording and a recording associated with a known acoustic environment(s). For example, suppose recording verification process 10 does not have access to a reference recording. Accordingly, recording verification process 10 uses a plurality of recordings with similar acoustic signatures to verify a suspect recording.

Figure 4:
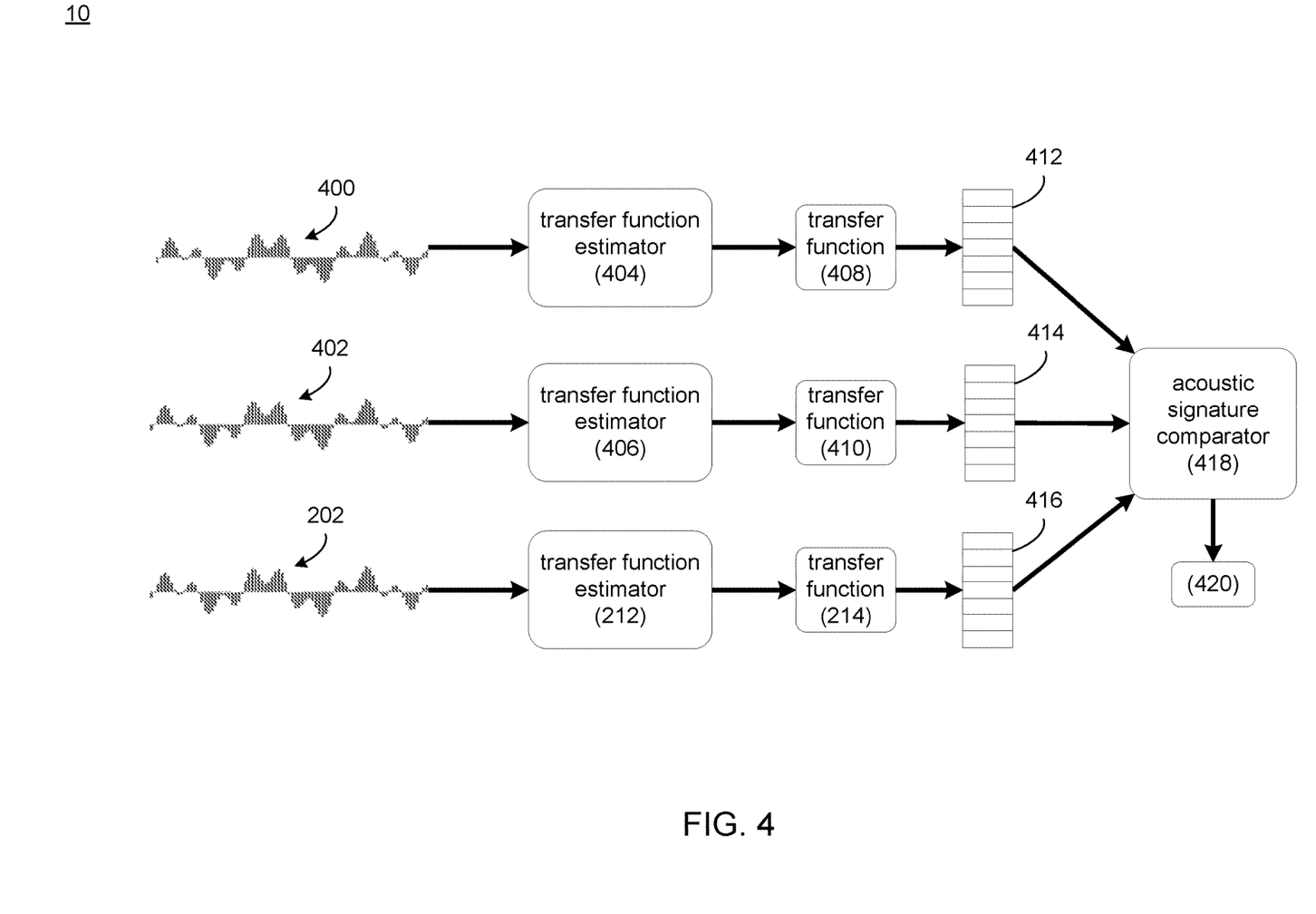
FIG. 4 is a diagrammatic view of the recording verification process.

Referring also to FIG. 4, recording verification process 10 aligns 108 a plurality of recordings associated with the known acoustic environments (e.g., recordings 400, 402) in lieu of a reference recording with a suspect recording (e.g., suspect recording 202). As discussed above, recording verification process 10 determines 300 a plurality of transfer functions for a plurality of segments of the aligned recordings. As shown in FIG. 4, a transfer function estimator (e.g., transfer function estimators 404, 406, 212) determines 300 the plurality of transfer functions (e.g., transfer functions 408, 410, 214, respectively) for the plurality of segments of the aligned recordings.

In some implementations, recording verification process 10 generates 302 an acoustic signature for each of the suspect recording and the recording associated with the known acoustic environment. In this example and as discussed above, recording verification process 10 generates 116 a plurality of acoustic signatures (e.g., acoustic signatures 412, 414, 416) for the plurality of transfer functions. In one example, acoustic signatures 412, 414, 416 are generated by extracting the acoustic properties from the plurality of transfer functions (e.g., transfer functions 408, 410, 214, respectively) in the manner described above.

In some implementations, recording verification process 10 compares the plurality of acoustic signatures (e.g., acoustic signatures 412, 414, 416) to verify the suspect recording (e.g., suspect recording 202). For example, recording verification process 10 uses an acoustic signature comparator (e.g., acoustic signature comparator 418) to compare the plurality of acoustic signatures (e.g., acoustic signatures 412, 414, 416) to generate a similarity score. In one example, the similarity score is a value ranging from "0" to "1" where "0" indicates that the acoustic signatures are entirely dissimilar and a "1" indicates that the acoustic signatures are the same.

In some implementations, recording verification process 10 aggregates acoustic signatures over recordings and segments. For example, as opposed to comparing acoustic signature 416 to both acoustic signatures 412, 414 of recordings 400, 402, recording verification process 10 aggregates acoustic signatures 412, 414 over recordings and segments to generate an aggregation of acoustic signatures 412, 414. Example aggregations of acoustic signatures include the mean, mode, standard deviation, skewness, or other combination of metrics of acoustic signatures 412, 414. In this manner, recording verification process 10 compares acoustic signature 416 of suspect recording 202 with the aggregated acoustic signature.

As with comparator 226 of FIG. 2, acoustic signature comparator 418 includes hardware and/or software components that compares acoustic signatures for similarity against a predefined threshold. The predefined threshold is user-defined, a default value, and/or dynamically generated using recording verification process 10. For example, recording verification process 10 uses a number of acoustic parameters to determine a similarity score and/or threshold for comparing acoustic signatures. For example, the acoustic parameters include, but are not limited to, a room volume within a predefined value (e.g., 3 cubic meters), a reflection coefficient within a predefined value (e.g., 0.1), etc.

In a similar manner to the generation of recording comparison confidence scores described above, recording verification process 10 uses a machine learning model to generate the predefined threshold. For example, the machine learning model is trained using labeled training data including acoustic signatures that are associated with recordings that are known to be the same and training data including acoustic signatures that are associated with recordings that are known to not be the same. In this example, recording verification process 10 uses a machine learning model to generate the predefined threshold for verifying the suspect recording using acoustic signatures of a plurality of recordings associated with the known acoustic environments.

In some implementations, recording verification process 10 verifies 304 the suspect audio recording based upon, at least in part, the acoustic signature of the suspect recording and the acoustic signature of the recording associated with the known acoustic environment. For example, recording verification process 10 determines whether the similarity between the acoustic signatures is greater than the predefined threshold. For example, if a similarity score is less than the predefined threshold, this indicates that the acoustic signatures between the suspect recording and the recording (s) associated with the known acoustic environment(s) are dissimilar. As such, the suspect recording is likely not a verified copy of a reference recording given the relatively distinct acoustic signature for the suspect recording. In this example, recording verification process 10 verifies that suspect recording 202 is not a verified copy of a reference recording by generating an alert or notification (e.g., notification 420). Notification 420 includes a message, prompt, signal or other communication provided to various recipients indicating that suspect recording 202 is not a verified copy of a reference recording.

In response to determining that the similarity score is greater than the predefined threshold, recording verification process 10 verifies that suspect recording 202 is a verified copy of reference recording. For example, if the similarity score is greater than or equal to the predefined threshold, this indicates that the acoustic signatures between the suspect recording and the recording(s) associated with the known acoustic environment(s) are similar. As such, the suspect recording is likely a verified copy of the reference recording given the relatively similar acoustic signatures for the suspect recording and the plurality of recordings associated with the known acoustic environments. In one example, recording verification process 10 verifies suspect recording 202 by generating an alert or notification (e.g., notification 420). Notification 420 includes a message, prompt, signal or other communication provided to various recipients indicating that suspect recording 202 is a verified copy of the reference recording.

In some implementations, recording verification process 10 identifies 306 a suspect recording source based upon, at least in part, the acoustic signature of the suspect recording and the acoustic signature of the recording associated with the known acoustic environment. For example, by comparing acoustic signatures from the suspect recording and the recording associated with the known acoustic environment, recording verification process 10 identifies 306 the suspect recording source. As noted above, a suspect recording source is the particular channel (e.g., video or audio channel) from which the suspect recording is recorded. In some implementations, recording verification process 10 generates an acoustic signature or accesses a pre-existing acoustic signature for the recording associated with the known acoustic environment. In one example, recording verification process 10 generates an acoustic signature for each channel of the recording associated with the known acoustic environment (e.g., a channel for each video and/or audio source).

As discussed above, suppose that a meeting is recorded including a small group of in-person participants and a few remote participants (e.g., participants participating with client electronic devices). Suppose that no authorized, reference recording exists. However, suppose that existing recordings associated with various participant's acoustic environments are available. In this example, the recordings associated with known acoustic locations include a plurality of channels for the in-person participants (e.g., a video channel and an audio channel for the in-person participants and a video channel and an audio channel for each remote participant). Accordingly, recording verification process 10 generates an acoustic signature for each channel (e.g., an acoustic signature for the in-person audio channel and acoustic signatures for each remote audio channel). Recording verification process 10 compares the acoustic signature of the suspect recording with the acoustic signature of the recordings associated with the known acoustic environment. Suppose that the suspect recording was captured by one of the remote participants. In this example, a comparison of the acoustic signature of the suspect recording to the acoustic signature of the channel of that remote participant's channel indicates that the suspect recording was captured by the remote participant. Accordingly, recording verification process 10 identifies 306 a suspect recording source (e.g., the remote participant) based upon, at least in part, the acoustic signature of the suspect recording and the acoustic signature of the recording associated with the known acoustic environment.

Figure 5:
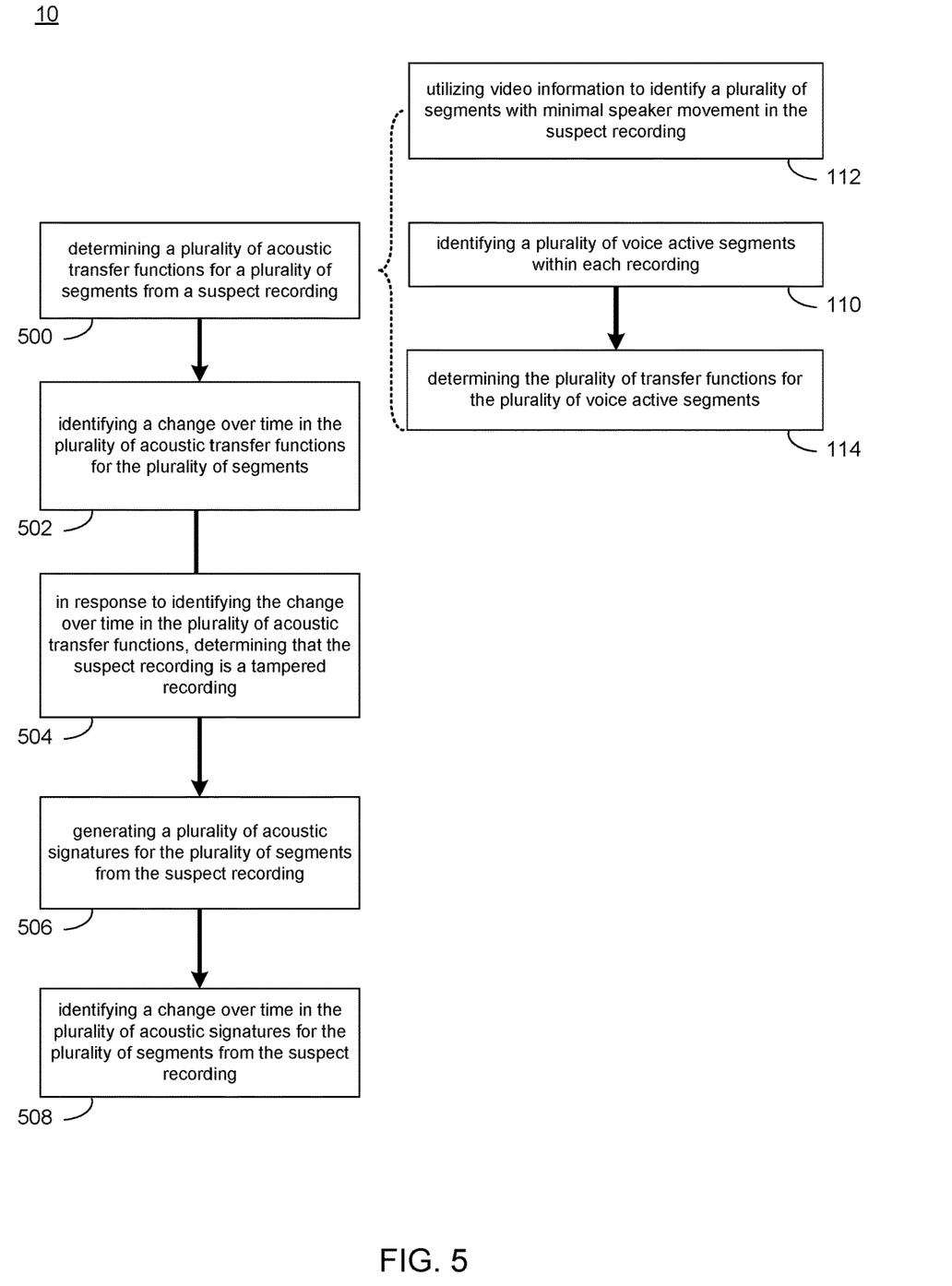
FIG. 5 is a flow chart of an implementation of the recording verification process.

Referring also to FIG. 5 and in some implementations, recording verification process 10 determines 500 a plurality of acoustic transfer functions for a plurality of segments from a suspect recording. A change over time in the plurality of acoustic transfer functions for the plurality of segments is identified 502. In response to identifying the change over time in the plurality of acoustic transfer functions, it is determined 504 that the suspect recording is a tampered recording.

For example, recording verification process 10 determines whether a recording is tampered with (e.g., a tampered recording) by monitoring for changes in transfer functions of recording over time. Suppose that a recording is broadcast that an interested party would like to verify (i.e., determine whether or not the recording is a tampered recording). A tampered recording is a recording that has been modified from its original form to include or omit portions of content (e.g., video and/or audio information). In this example, recording verification process 10 uses changes in acoustic transfer functions over time to determine whether or not the suspect recording is a tampered recording.

Figure 6:
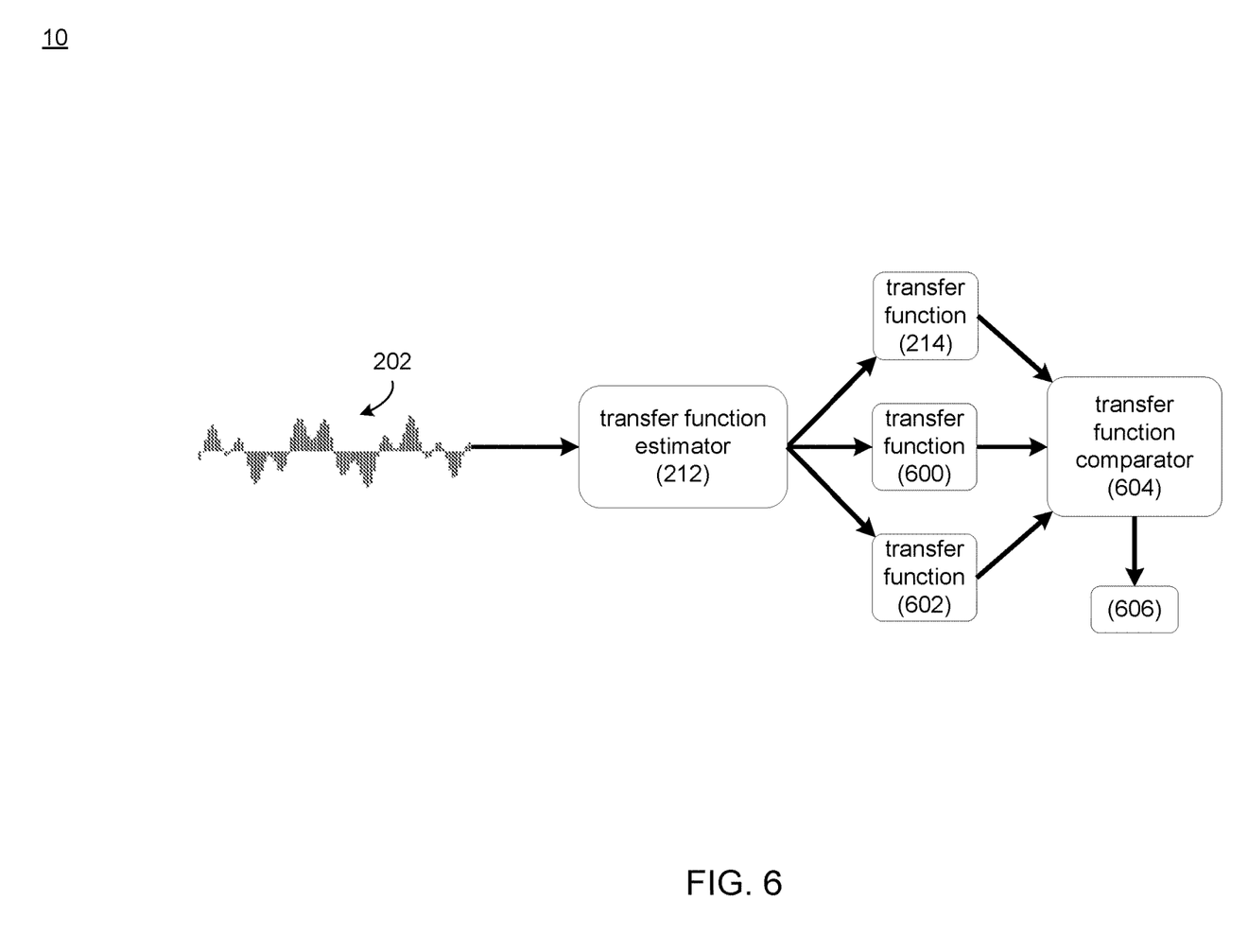
FIG. 6 is a diagrammatic view of the recording verification process.

In some implementations and as discussed above, recording verification process 10 determines 500 a plurality of acoustic transfer functions for a plurality of segments from a suspect recording. Referring also to FIG. 6, suppose that recording verification process 10 determines 500 a plurality of acoustic transfer functions for a plurality of segments from suspect recording 202. Specifically, suppose that recording verification process 10 determines e.g., three different transfer functions (e.g., transfer functions 214, 600, 602) for different segments of suspect recording 202.

In some implementations, recording verification process 10 identifies 502 a change over time in the plurality of acoustic transfer functions for the plurality of segments. For example, suppose that suspect recording 202 includes content from e.g., three different yet similar recordings that have been combined to form suspect recording 202. In this example, recording verification process 10 monitors the plurality of acoustic transfer functions (e.g., transfer functions 214, 600, 602) for any changes over time. For example, suppose that during the course of suspect recording 202, that the transfer functions (e.g., transfer functions 214, 600, 602) switch between transfer function 214 for a first period of time to transfer function 600 for a second period of time, and to transfer function 602 for a third period of time and so on. In this example, the changes in the transfer function over time indicate that e.g., three different original recordings are involved in suspect recording 202. In some implementations, recording verification process 10 uses a transfer function comparator (e.g., transfer function comparator 604) to identify 502 changes over time. For example, transfer function comparator 604 includes a hardware and/or software component that compares the changes in the plurality of transfer functions against a predefined threshold. The predefined threshold is user-defined, a default value, and/or dynamically generated using recording verification process 10.

In some implementations and in response to identifying the change over time in the plurality of acoustic transfer functions, recording verification process 10 determines 504 that the suspect recording is a tampered recording. For example, recording verification process 10 determines whether the similarity between the transfer functions is greater than the predefined threshold. For example, if a similarity score is less than the predefined threshold, this indicates that the transfer functions change over time. As such, the suspect recording is likely a tampered recording. In this example, recording verification process 10 determines 500 that suspect recording 202 is a tampered recording by generating an alert or notification (e.g., notification 606). Notification 606 includes a message, prompt, signal or other communication provided to various recipients indicating that suspect recording 202 is a tampered recording.

In another example and in response to determining that the similarity score is greater than the predefined threshold, suppose that recording verification process 10 determines 504 that suspect recording 202 has a single transfer function. For example, if the similarity score is greater than or equal to the predefined threshold, this indicates that the transfer functions do not change over time. As such, the suspect recording is likely not a tampered recording given the relatively similar transfer functions over time in the suspect recording. Accordingly, recording verification process 10 verifies suspect recording 202 by generating an alert or notification (e.g., notification 606). Notification 606 includes a message, prompt, signal or other communication provided to various recipients indicating that suspect recording 202 is not a tampered recording.

In some implementations, recording verification process 10 generates 506 a plurality of acoustic signatures for the plurality of segments from the suspect recording and identifies 508 a change over time in the plurality of acoustic signatures for the plurality of segments from the suspect recording. For example and as discussed above, recording verification process 10 generates 506 a plurality of acoustic signatures for particular segments of the suspect recording. The acoustic signature is a representation of various acoustic parameters of a segment of a recording (e.g., room volume, reflection/absorption coefficient, etc.). As with the transfer functions discussed above, a change in acoustic signatures over time is indicative of multiple recordings. For example, suppose that recording verification process 10 identifies 508 a change over time in the plurality of acoustic signatures. In this example, recording verification process 10 determines 504 that suspect recording 202 is a tampered recording because of the change over time in the plurality of acoustic signatures indicating different acoustic environments. In a similar manner, recording verification process 10 verifies suspect recording 202 by generating an alert or notification (e.g., notification 606).

Figure 7:
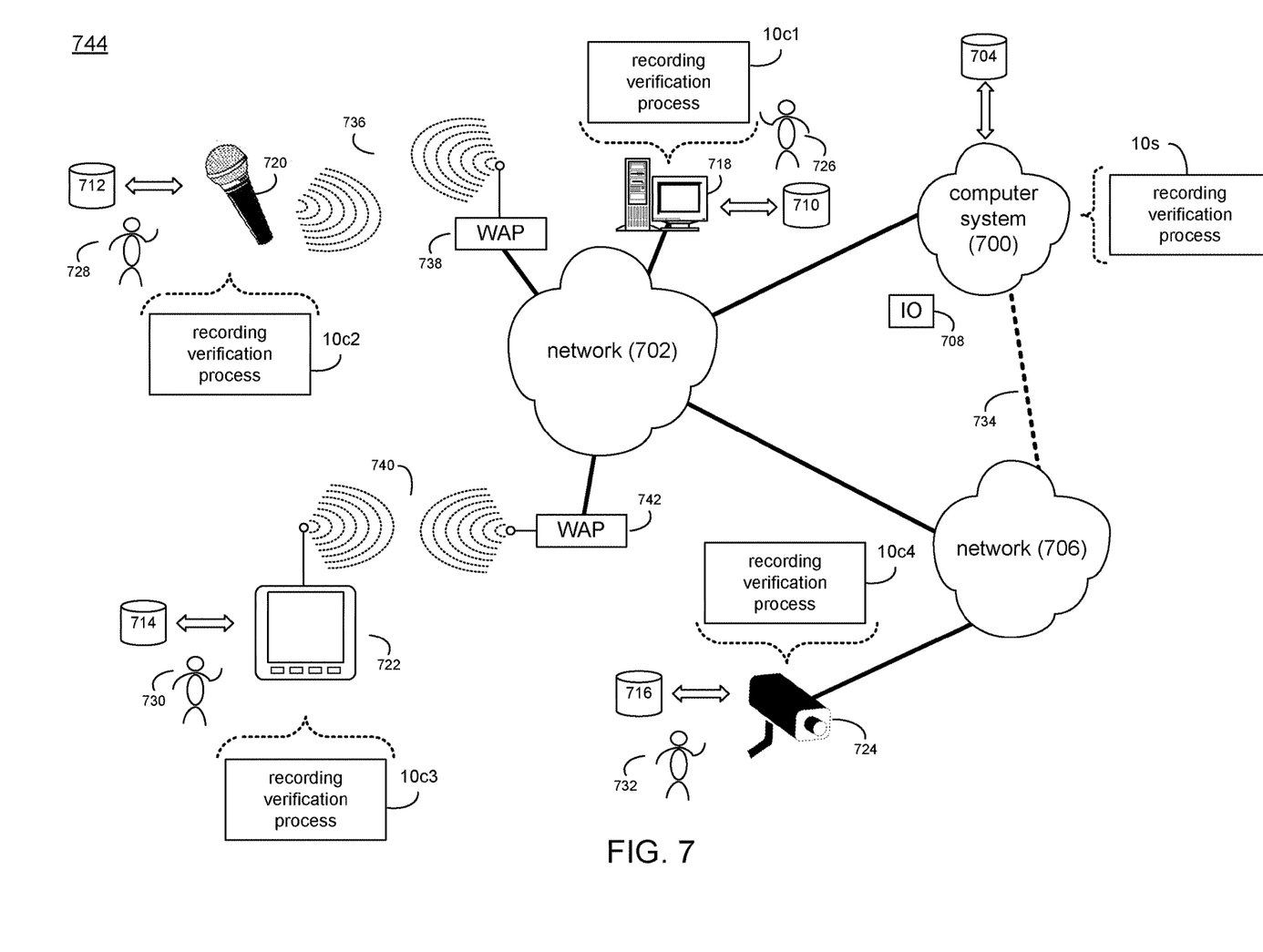
FIG. 7 is a diagrammatic view of a computer system and the recording verification process coupled to a distributed computing network.

System Overview:

Referring to FIG. 7, there is shown recording verification process 10.

Recording verification process 10 may be implemented as a server-side process, a client-side process, or a hybrid server-side/client-side process. For example, recording verification process 10 may be implemented as a purely server-side process via recording verification process 10s. Alternatively, recording verification process 10 may be implemented as a purely client-side process via one or more of recording verification process 10c1, recording verification process 10c2, recording verification process 10c3, and recording verification process 10c4. Alternatively still, recording verification process 10 may be implemented as a hybrid server-side/client-side process via recording verification process 10s in combination with one or more of recording verification process 10c1, recording verification process 10c2, recording verification process 10c3, and recording verification process 10c4.

Accordingly, recording verification process 10 as used in this disclosure may include any combination of recording verification process 10s, recording verification process 10c1, recording verification process 10c2, recording verification process 10c3, and recording verification process 10c4.

Recording verification process 10s may be a server application and may reside on and may be executed by a computer system 700, which may be connected to network 702 (e.g., the Internet or a local area network). Computer system 700 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 700 may execute one or more operating systems.

The instruction sets and subroutines of recording verification process 10s, which may be stored on storage device 704 coupled to computer system 700, may be executed by one or more processors (not shown) and one or more memory architectures (not shown) included within computer system 700. Examples of storage device 704 may include but are not limited to: a hard disk drive; a RAID device; a random access memory (RAM); a read-only memory (ROM); and all forms of flash memory storage devices.

Network 702 may be connected to one or more secondary networks (e.g., network 704), examples of which may include but are not limited to: a local area network; a wide area network; or an intranet, for example.

Various IO requests (e.g., IO request 708) may be sent from recording verification process 10s, recording verification process 10c1, recording verification process 10c2, recording verification process 10c3 and/or recording verification process 10c4 to computer system 700. Examples of IO request 708 may include but are not limited to data write requests (i.e., a request that content be written to computer system 700) and data read requests (i.e., a request that content be read from computer system 700).

The instruction sets and subroutines of recording verification process 10c1, recording verification process 10c2, recording verification process 10c3 and/or recording verification process 10c4, which may be stored on storage devices 710, 712, 714, 716 (respectively) coupled to client electronic devices 718, 720, 722, 724 (respectively), may be executed by one or more processors (not shown) and one or more memory architectures (not shown) incorporated into client electronic devices 718, 720, 722, 724 (respectively). Storage devices 710, 712, 714, 716 may include but are not limited to: hard disk drives; optical drives; RAID devices; random access memories (RAM); read-only memories (ROM), and all forms of flash memory storage devices. Examples of client electronic devices 718, 720, 722, 724 may include, but are not limited to, personal computing device 718 (e.g., a smart phone, a personal digital assistant, a laptop computer, a notebook computer, and a desktop computer), audio input device 720 (e.g., a handheld microphone, a lapel microphone, an embedded microphone (such as those embedded within eyeglasses, smart phones, tablet computers and/or watches) and an audio recording device), display device 722 (e.g., a tablet computer, a computer monitor, and a smart television), machine vision input device 724 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 726, 728, 730, 732 may access computer system 700 directly through network 702 or through secondary network 706. Further, computer system 700 may be connected to network 702 through secondary network 706, as illustrated with link line 734.

The various client electronic devices (e.g., client electronic devices 718, 720, 722, 724) may be directly or indirectly coupled to network 702 (or network 706). For example, personal computing device 718 is shown directly coupled to network 702 via a hardwired network connection. Further, machine vision input device 724 is shown directly coupled to network 706 via a hardwired network connection. Audio input device 722 is shown wirelessly coupled to network 702 via wireless communication channel 736 established between audio input device 720 and wireless access point (i.e., WAP) 738, which is shown directly coupled to network 702. WAP 738 may be, for example, an IEEE 802.11a, 802.11b, 802.11g, 802.11n, Wi-Fi, and/or Bluetooth™ device that is capable of establishing wireless communication channel 736 between audio input device 720 and WAP 738. Display device 722 is shown wirelessly coupled to network 702 via wireless communication channel 740 established between display device 722 and WAP 742, which is shown directly coupled to network 702.

The various client electronic devices (e.g., client electronic devices 718, 720, 722, 724) may each execute an operating system, wherein the combination of the various client electronic devices (e.g., client electronic devices 718, 720, 722, 724) and computer system 700 may form modular system 744.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved.

It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    aligning a reference recording with a target recording;
    determining a plurality of transfer functions for a plurality of corresponding segments from the reference recording and the target recording;
    determining a delta transfer function between a subset of transfer functions within the plurality of transfer functions, the subset of transfer functions corresponding to a pair of corresponding segments in the plurality of corresponding segments;
    generating a recording comparison confidence score based upon, at least in part, the delta transfer function; and
    verifying the target recording based upon, at least in part, the recording comparison confidence score.

2. The computer-implemented method of claim 1, wherein each of the reference recording and the target recording is a video recording or an audio recording.

3. The computer-implemented method of claim 1, wherein aligning the reference recording with the target recording includes:
    identifying a plurality of voice active segments within each of the reference recording and the target recording.

4. The computer-implemented method of claim 3, wherein identifying the plurality of voice active segments within each of the reference recording and the target recording includes:
  using video information to identify a plurality of segments with minimal speaker movement.

5. The computer-implemented method of claim 3, wherein determining the plurality of transfer functions for the plurality of segments from the reference recording and the target recording includes:
  determining the plurality of transfer functions for the plurality of voice active segments.

6. The computer-implemented method of claim 1, further comprising:
  generating an acoustic signature of the target recording; and
  identifying a recording source of the target recording based upon, at least in part, the acoustic signature of the target recording to an acoustic signature of the reference recording.

7. The computer-implemented method of claim 1, wherein verifying the target recording includes:
  aggregating a plurality of recording comparison confidence scores to generate an aggregated recording comparison confidence score;
  determining whether the aggregated recording comparison confidence score is greater than a predefined threshold; and
  in response to determining that the aggregated recording comparison confidence score is greater than the predefined threshold, verifying the target recording.

8. The computer-implemented method of claim 1, wherein verifying the target recording includes at least one of:
  determining whether the target recording is an authorized version of the reference recording based upon, at least in part, the recording comparison confidence score; and
  identifying a recording source of the target recording based upon, at least in part, the recording comparison confidence score.

9. A computing system comprising:
  a memory storing programming instructions; and
  a processor configured to execute the programming instructions, wherein the programing instructions, upon execution by the processor, cause the computing system to align a suspect recording with a recording associated with a known acoustic environment, to determine a plurality of acoustic transfer functions for a plurality of corresponding segments from the suspect recording and the recording associated with the known acoustic environment, to generate an acoustic signature of the suspect recording and an acoustic signature of the recording associated with the known acoustic environment, and to verify the suspect recording based upon, at least in part, the acoustic signature of the suspect recording and the acoustic signature of the recording associated with the known acoustic environment.

10. The computing system of claim 9, wherein aligning the suspect recording with the recording associated with the known acoustic environment includes:
  identifying a plurality of voice active segments within each recording.

11. The computing system of claim 10, wherein determining the plurality of transfer functions for a plurality of corresponding segments includes:
  determining the plurality of transfer functions for the plurality of voice active segments.

12. The computing system of claim 9, wherein determining the plurality of transfer functions for the plurality of corresponding segments includes:
  using video information to identify a plurality of segments with minimal speaker movement.

13. The computing system of claim 9, wherein the programming instructions further cause the computing system to identify a recording source of the suspect recording based upon, at least in part, comparing the acoustic signature of the suspect recording to the acoustic signature of the recording associated with the known acoustic environment.

14. A computer program product residing on a non-transitory computer readable medium having a plurality of instructions stored thereon which, when executed by a processor, cause the processor to perform operations comprising:
  determining a plurality of acoustic transfer functions for a plurality of segments from a suspect recording, wherein determining the plurality of acoustic transfer functions for the plurality of segments from the suspect recording includes identifying a plurality of voice active segments within the suspect recording;
  identifying a change over time in the plurality of acoustic transfer functions for the plurality of segments; and
  in response to identifying the change over time in the plurality of acoustic transfer functions, determining that the suspect recording is a tampered recording.

15. The computer program product of claim 14, wherein identifying the plurality of voice active segments within the suspect recording includes:
  using video information to identify a plurality of segments with minimal speaker movement.

16. The computer program product of claim 14, wherein determining the plurality of transfer functions for a plurality of segments from the suspect recording includes:
  determining the plurality of transfer functions for the plurality of voice active segments.

17. The computer program product of claim 14, wherein the operations further comprise:
  generating a plurality of acoustic signatures for the plurality of segments from the suspect recording; and
  identifying a change over time in the plurality of acoustic signatures for the plurality of segments from the suspect recording.

* * * * *